(12) United States Patent
Tissmer et al.

(10) Patent No.: US 12,151,846 B2
(45) Date of Patent: Nov. 26, 2024

(54) PLASTIC CONTAINER FOR HOLDING BEVERAGES WITH IMPROVED STABILITY

(71) Applicant: KRONES AG, Neutraubling (DE)

(72) Inventors: Bastian Tissmer, Regensburg (DE); Martin Hintermeier, Mintraching (DE); Peter Knapp, Schmatzhausen (DE)

(73) Assignee: KRONES AG (DE)

(*) Notice: Subject to any disclaimer, the term of this patent is extended or adjusted under 35 U.S.C. 154(b) by 133 days.

(21) Appl. No.: 17/903,891

(22) Filed: Sep. 6, 2022

(65) Prior Publication Data

US 2023/0119605 A1    Apr. 20, 2023

(30) Foreign Application Priority Data

Oct. 19, 2021   (DE) .................. 10 2021 127 061.8

(51) Int. Cl.
*B65D 1/02*    (2006.01)
*B29C 49/18*   (2006.01)
(Continued)

(52) U.S. Cl.
CPC ............ *B65D 1/0284* (2013.01); *B29C 49/18* (2013.01); *B29C 49/48* (2013.01); *B29L 2031/7158* (2013.01)

(58) Field of Classification Search
CPC ....... B65D 1/0284; B29C 49/18; B29C 49/48; B29L 2031/7158
See application file for complete search history.

(56) References Cited

U.S. PATENT DOCUMENTS

| 10,358,250 B2 | 7/2019 | Wortmann et al. .. B65D 1/0261 |
| 2014/0227399 A1 | 8/2014 | Wortmann et al. ...... B65D 1/02 |

(Continued)

FOREIGN PATENT DOCUMENTS

| DE | 102013101332 | 8/2014 | ............... B65D 1/02 |
| DE | 202019105777 | 12/2019 | ............... B65D 1/02 |

(Continued)

OTHER PUBLICATIONS

European Search Report issued in European Patent Appln. Serial No. 22201463.1, dated Mar. 21, 2023 with machine English translation, 11 pages.

(Continued)

*Primary Examiner* — Shawn M Braden
(74) *Attorney, Agent, or Firm* — HAYES SOLOWAY P.C.

(57) ABSTRACT

Plastic container with a base section, with a main body adjoining the base section in a longitudinal direction of the container forming an inner volume of the plastic container wherein the base section forms a plurality of standing foot areas, wherein a tension band extending in a radial direction is disposed between two adjacent standing foot areas, and the base section has a first curved structure with an injection point such that that the injection point projects in the longitudinal direction of the plastic container towards a mouth of the plastic container and a second curved structure adjoins the first curved structure outwardly in the radial direction, wherein this second curved structure is curved in the direction of the mouth of the plastic container, wherein a radius of curvature of the first curved structure is smaller, at least in sections, than a radius of curvature of the second curved structure.

18 Claims, 13 Drawing Sheets

(51) Int. Cl.
    *B29C 49/48*     (2006.01)
    *B29L 31/00*     (2006.01)

(56) References Cited

U.S. PATENT DOCUMENTS

| | | | |
|---|---|---|---|
| 2016/0144992 A1 | 5/2016 | Hermel | B65D 1/02 |
| 2019/0308764 A1* | 10/2019 | Pierre | B65D 1/0284 |
| 2021/0024240 A1 | 1/2021 | Huettner et al. | B65D 1/0284 |

FOREIGN PATENT DOCUMENTS

| | | | | |
|---|---|---|---|---|
| DE | 102019119984 | 1/2021 | | B65D 1/02 |
| EP | 2289809 | 3/2011 | | B65D 1/02 |
| EP | 2764979 | 8/2014 | | B29C 49/18 |
| FR | 3007392 | 12/2014 | | B65D 1/02 |
| WO | WO2018065691 | 4/2018 | | B65D 1/02 |

OTHER PUBLICATIONS

German Search Report issued in German Patent Appln. Serial No. 10 2021 127 061.8, dated Jul. 15, 2022 with machine English translation, 11 pages.

\* cited by examiner

PLASTIC CONTAINER FOR HOLDING BEVERAGES WITH IMPROVED STABILITY

BACKGROUND OF THE INVENTION

The present invention relates to a plastic container, in particular for holding beverages. Such containers have been known in the prior art for some time and are increasingly replacing glass bottles as beverage containers. The advantage of these plastic containers lies in particular in their lower weight, optimum manageability in terms of design and, in part, in their multiple usability.

Various bottles of different sizes are known from the state of the art, both for small filling quantities in the range of 200 ml up to large filling quantities of 5 litres. These containers have a wide variety of shapes. Within the scope of manufacturing processes, preforms are inflated or expanded to form the plastic containers, for example by means of air pressure. For this purpose, preforms are usually fed into a mould and expanded relative to this mould.

In order to save costs, attempts are being made to produce the plastic containers with less and less material input and energy input (especially compressed air and heating power). On the other hand, however, this means that increasingly higher demands have to be made on the stability of the bottles in relation to the amount of material used.

The bottoms of these plastic containers are particularly critical. On the one hand, these bottoms must also serve as standing surfaces for the containers and, on the other hand, they must also withstand higher internal pressures in some cases. At the same time, the bottoms should also be produced with ever lower material costs.

Products in the food industry are stabilised for transport with nitrogen (N2) or carbon dioxide (CO2) in the container (e.g. PET bottle). Nitrogen and carbon dioxide are additives in the food industry and primarily serve to protect food. The gases displace oxygen and thus prevent food from spoiling quickly. It also ensures that food retains its colour and smell.

Manufacturers do not always want to have a petaloid base (5 base or multi base) under their bottles which can withstand an internal pressure of up to 5.0 bar. The bottles should look more like a still water bottle but still be able to withstand an internal pressure of up to 3.0 bar from nitrogen or another gas.

The present invention relates in particular to containers for so-called still waters and pressurised products. In the case of these products, the shaping, in particular of the foot radii of the bottle bases at the grooves of the base was only possible with a high finished blowing pressure of over 30 bar. However, this means an increased energy input in the production of such containers. Furthermore, such a high final blowing pressure of over 30 bar for forming the foot radii of the grooves of a base design does not provide any security for pressure stability without sampling the bottle in the filled state.

A plastic container is known from DE 10 2013 101 332 A1. This has a bottom section with a dome-like structure, wherein an injection point itself is also formed in a dome-like substructure.

The invention is therefore based on the object of providing a cost-effective production of the plastic container, which nevertheless also withstands certain internal pressures. In particular, a plastic container is to be made available which can also be produced with lower finished blowing pressures. Even when filling non-carbonated beverages, in particular without carbon dioxide, the plastic container must withstand low internal pressures, which can be caused, for example, by increased outside temperatures in the vicinity of the plastic container.

SUMMARY OF THE INVENTION

A plastic container according to the invention, in particular a blow-moulded plastic container and in particular a stretch-blow-moulded plastic container for holding liquids and in particular beverages, has a base section which forms an at least partially circumferential standing surface. In addition, the plastic container has a main body adjoining this base section in a longitudinal direction of the plastic container, which main body forms an inner volume of the plastic container (for holding a liquid) and within which the liquid can be hold, as well as a mouth section with a mouth via which a liquid can be filled into the plastic container.

According to the invention, the base section forms (or has) a plurality of standing foot areas, wherein a reinforcing rib extending in a radial direction (of the plastic container) and/or a tension band extending in a radial direction is arranged between (in each case) two adjacent standing foot areas and the base section has (in particular in a central region) a first dome-like structure with an injection point in such a way in that the injection point projects in the longitudinal direction of the plastic container in the direction of the mouth of the plastic container, and a second curved and/or dome-like structure adjoins the first curved (and/or dome-like) structure outwards in the radial direction (of the plastic container), wherein said second dome-like structure is curved in the direction of the mouth of the plastic container and wherein a radius of curvature of the first dome-like structure is at least in sections and preferably completely smaller than a radius of curvature of the second dome-like structure and wherein at least one tension band has a first section and a second section which preferably each extend in the radial direction and which are particularly preferably spaced from each other.

In a further (alternative or additional) embodiment according to the invention, a total weight of the base section is greater than 2 g, preferably greater than 3 g, preferably 5 g, preferably greater than 7 g and preferably greater than 8 g. In a further preferred embodiment, a total weight of the base section is less than 30 g, preferably less than 25 g, preferably less than 20 g.

Preferably, at least one tension band widens inwards in the radial direction at least in sections. Preferably, the first section of at least one tension band, i.e. in particular the radially further inward section of the tension band, widens inwardly in the radial direction. In a further preferred embodiment, this is a continuous widening. (The width of the tension band is thereby considered in particular of a circumferential direction of the base section).

Particularly preferably, said first or inner portion of at least one tension band and preferably of each tension band widens by at least 10%, preferably by at least 20%, preferably by at least 30%, preferably by at least 40% and particularly preferably by at least 50%.

In a preferred embodiment, in at least one section of the tension band, and in particular in a radially inner section of the tension band, its width is greater than a distance between this tension band and an adjacent tension band.

Preferably, in at least one section of the tension band, and in particular in a radially inner section of the tension band, its width is not less than 90% of the distance between this tension band and an adjacent tension band, preferably not less than 80% of this distance (wherein the distance between the tension bands being considered in a circumferential direction of the base section).

In a further preferred embodiment, at least one tension band widens outwards in the radial direction at least in sections. Preferably, at least one section of a tension band widens outwards in the radial direction. Preferably, at least a section of all tension bands widens outwards in the radial direction. Preferably, the section of at least one tension band widens by at least 10%, preferably by at least 20%, preferably by at least 30% and preferably by at least 40%.

In a further preferred embodiment, the above-mentioned standing surface is interrupted at least once and preferably several times in the circumferential direction of the container. Preferably, the standing surface is interrupted in the areas where the tension bands are located. Preferably, the number of interruptions of the standing surface corresponds to the number of the standing foot areas. In a preferred embodiment, the standing surface is ring-shaped.

Preferably, the standing surface has a width in the radial direction of the container which is greater than 0.5 mm, preferably greater than 0.8 mm, preferably greater than 1.0 mm and particularly preferably greater than 1.5 mm and particularly preferably greater than 2 mm and particularly preferably greater than 5 mm. Preferably, the standing surface has a width in the radial direction of the container that is smaller than 3 cm, preferably smaller than 2.5 cm, preferably smaller than 2 cm and more preferably smaller than 1.5 cm.

Preferably, the base section extends into the main body of the container or ends when the circumferential shape or circumferential wall of the container extends substantially in the longitudinal direction of the container. Preferably, the base section is the area created by a blow moulding operation using a base part of a blow mould.

Preferably, a multi-part and in particular three-part blow mould is used to produce the plastic container, which preferably has a base part and two side parts. The base part is used to form the base section of the plastic container. That part of the plastic container which is produced by the base part preferably has the above-mentioned weight or mass.

The considerable mass of the base section described here ensures that it has sufficient stability. On the other hand, the weight of the base section is also kept as low as possible in order to reduce the overall weight of the entire container.

Preferably, the proportion by weight of the base section to the total weight of the plastic container is greater than 10%, preferably greater than 15%, preferably greater than 20%.

Particularly preferably, a proportion by weight of the base section in a total weight of the plastic container is less than 50%, preferably less than 40%, preferably less than 35%.

Preferably, the central area is circular and/or has a circular cross-section. This applies in particular if the overall structure of the container is also circular.

In a further advantageous embodiment, a height of the first dome-like and/or domed structure is in a ratio to the height of the base section which is between 0.25, and 0.80. In a further advantageous embodiment, the height of the second dome-like and/or curved structure has a ratio to the height of the base section which is less than 0.5.

In a further advantageous embodiment, the base section merges into the main body via a spline, wherein a curvature of this spline can preferably be described by a polynomial of the nth degree and this degree preferably lies between 2 and 7.

A spline of the nth degree is a function that is composed piecewise of polynomials of at most the nth degree. At the points where two polynomial pieces meet, certain conditions are imposed, such as that the spline times be continuously differentiable.

This design of the container makes it possible to reduce the final blowing pressure for the containers to less than 20 bar. At this final blowing pressure, the base geometry described here can be formed very well. Furthermore, the base design described here is characterised by a safety for pressure stability in a filled state and is pressure stable in a filled state even after thermostability tests of more than 38° over 24 hours. This container can withstand pressures in the range of at least 0.5 bar. In preferred embodiments described in more detail below, can also withstand pressures in the range of at least 0.8 bar, preferably at least 1.0 bar, preferably at least 2.0 bar, preferably at least 2.5 bar.

Advantageously, said central area has a circular cross-section and is dome-shaped or dome-like, as mentioned above. In this way, the injection point of the container itself protrudes in the direction of the inner volume, which means that even under a pressure load, the injection point does not protrude downwards in the longitudinal direction of the container and impede its standing stability.

Advantageously, the injection point is located on an outer surface of the plastic container. Preferably, the injection point is located within an area that is essentially horizontal (when the plastic container is standing upright). This area may form an uppermost portion of the first curved structure.

The second dome-like or curved structure also serves in particular to absorb or counteract pressures. Preferably, a central area (which contains the injection point) has a larger radius of curvature in its entire area than the second dome-like structure. It is possible that these radii of curvature are constant, but it is also conceivable that the radii of curvature change in a radial course of the wall.

Preferably, at least two sections of the base section merge in each case tangentially into one further section of the base section. For example, it is possible that the radius (or the curved section) of the central area merges tangentially into the first radius (or first curved section) of the transition area, which connects to the outside.

Also, a first radius (or a curved section) of the transition area can tangentially merge into another radially outer area of the transition area. Furthermore, a radius of the curved area can also tangentially merge into a radius of a foot of the container. In addition, it is also possible for a curved section of a foot area of the container to merge tangentially into a section of the wall of the container.

Preferably, the second dome-like structure or curved portion extends relative to the longitudinal direction of the container at an angle greater than 20°, preferably greater than 30°, preferably greater than 40° and preferably greater than 50°. In a further advantageous embodiment, the second dome-like structure or portion runs at an angle relative to the longitudinal direction of the container which is less than 80°, preferably less than 70°. These indications are to be understood in the sense that a tangent, and preferably any tangent, applied to the second dome-like structure or domed portion (and also extending in the radial direction of the base section) always runs at said angles with respect to the longitudinal direction.

Preferably, all standing foot areas of the container are of the same design. Particularly preferably, the base section has at least three, preferably at least four and especially preferably at least five foot areas. Particularly preferably the base section has less than 10, preferably less than 9 and particularly preferably less than 8 foot areas.

Particularly preferably, the reinforcing ribs or tension bands of the base section are also designed in the same way. Particularly preferably, only one type of such reinforcing ribs is provided and/or all reinforcing ribs or tension bands have the same length. In the context of the present application, the terms reinforcing rib and tension band are used synonymously.

Particularly preferably, the base section only has the standing foot areas and the tension bands in between. It is therefore particularly preferred that only one type of tension band is provided. As described in more detail below, these can be made in one piece or in several pieces or in one continuous section or in several sections.

Particularly preferably, at least one standing foot area and preferably several standing foot areas and preferably all standing foot areas are spaced from the central area and/or the first dome-like structure in the radial direction of the base section. Particularly preferably, this distance is greater than 0.2 mm, preferably greater than 0.4 mm. In a further advantageous embodiment, this distance is less than 7 mm.

In another preferred embodiment, a ratio between a standing circle diameter and an outer diameter of the container is between 0.615 and 0.835 and preferably between 0.63 and 0.77 and preferably between 0.65 and 0.75.

In a further advantageous embodiment, the tension band and/or the reinforcing rib runs at least in sections in a straight line (viewed in a projection along the longitudinal direction of the plastic container).

In a further advantageous embodiment, the tension band and/or the reinforcing rib is formed in two parts. Thus, it is possible that the tension band and/or the reinforcing rib is interrupted in the radial direction. Thus, the tension band may comprise a first radial section extending in a predetermined radial direction and a second section extending in the same radial direction, wherein said sections preferably being interrupted by a web or the like. Preferably, the second section of the tension band, which is further out in the radial direction of the base section than the first section, is longer than this first section.

However, it is also possible that the tension band and/or the reinforcing rib changes its shape in radial direction. For example, in sections the tension band can have a first cross-sectional shape, and in a further radial section a second shape which differs from the first shape.

In a further advantageous embodiment, the tension band and/or the reinforcing rib has a cross-section selected from a group of cross-sections including trapezoidal cross-sections, circular segmental cross-sections, elliptical cross-sections, triangular cross-sections, rectangular cross-sections and the like, or mixed shapes of these cross-sections. It is possible that the cross-section changes in a radial direction of the base section. For example, it is possible that the tension band and/or its cross-section widens in the radial direction. In a further advantageous embodiment, all the tension bands of the base section are formed in the same way.

In a further preferred embodiment, the base section has only one type of tension band and/or all tension bands are designed in the same way. In a further preferred embodiment, the number of tension bands (or the number of tension bands composed of two or more sections) corresponds to the number of standing foot areas.

In a further advantageous embodiment, the base section has at least one and preferably a plurality of grooves running around in the circumferential direction of the base section. Preferably, the number of these grooves is adapted to and/or corresponds to the number of standing foot areas. Particularly preferably, these grooves are arranged in the base section above the standing foot areas or in an area in which the base section merges into the main body. In addition, it would also be possible for the grooves to be arranged in the area of the above-mentioned tension bands and/or stabilisation areas.

These grooves also help to stabilise the base section.

The present invention is further directed to a method of manufacturing a plastic container of the type described above. In this process, plastic preforms are first provided. Further, these plastic preforms are heated and finally the plastic preforms are expanded within a blow mould, wherein a base part of this blow mould is configured to produce a base section of a plastic container according to at least one of the preceding claims.

According to the invention, the plastic preforms are pressurised with a gaseous medium with at least two different pressure levels for their expansion, wherein one of these pressure levels is a final blowing pressure and this final blowing pressure is below 30 bar, preferably below 25 bar and particularly preferably below 20 bar.

Through these selected pressure levels, as mentioned above, a considerable energy saving can be achieved during the forming process. On the other hand, however, these pressure levels are sufficient to produce the corresponding base section. Preferably, a time duration of the application of the final blowing pressure is between 0.9 seconds and 2.2 seconds, preferably between 0.9 seconds and 2.0 seconds and preferably between 0.9 seconds and 1.8 seconds.

The present invention is further directed to the use of a plastic container of the type described above for filling with a pressurised beverage. Such beverages preferably cause an internal pressure of up to 2.5 bar, in particular up to 3.0 bar, within the container in a closed state thereof.

Preferably, the plastic container is made of PET. In a further preferred embodiment, the plastic container has a volume that is between 200 ml and 5.0 l, preferably between 300 ml and 4.0 l, preferably between 500 ml and 3.0 l.

The invention is further directed to a blow mould for producing a plastic container of the type described above. This blow mould has a base part which is suitable for producing a base section for the plastic container of the type described above. Advantageously, the blow mould also has two side parts which serve to produce a circumferential wall of the plastic container.

BRIEF DESCRIPTION OF THE DRAWINGS

Further advantages and embodiments can be seen in the attached drawings.

Show in it.

DETAILED DESCRIPTION OF THE INVENTION

Figures 1A, 1B:
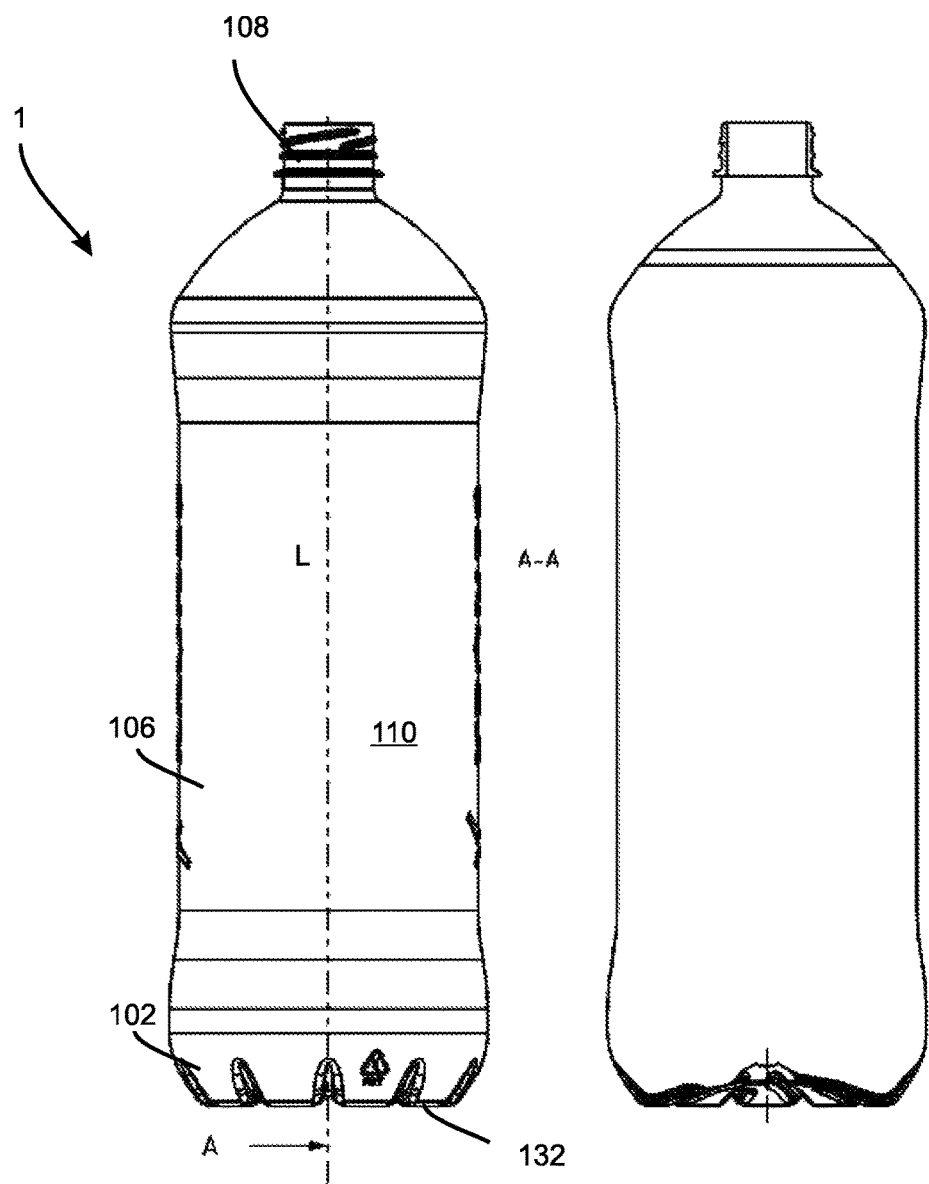
FIG. 1a-d four illustrations of a plastic container.
Figure 1C:
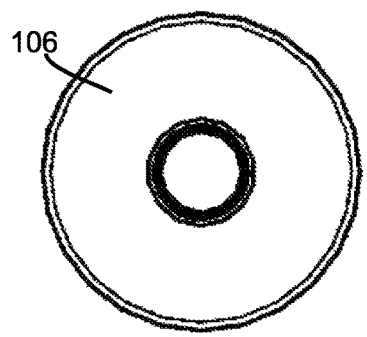
Figure 1D:
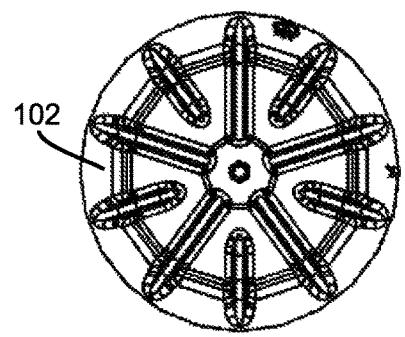

FIGS. 1a-1d show four representations of a container 1 according to the internal prior art of the applicant. This container has a base section 102 and a main body 106 adjoining this base section 102 in the longitudinal direction L, which forms a substantial part of the internal volume 110 of the container 1.

The reference sign 108 indicates a mouth or a mouth section of the plastic container. The reference sign 132 indicates a standing area of the plastic container. This standing area can be circular and in particular circular with interruptions.

Figure 2:
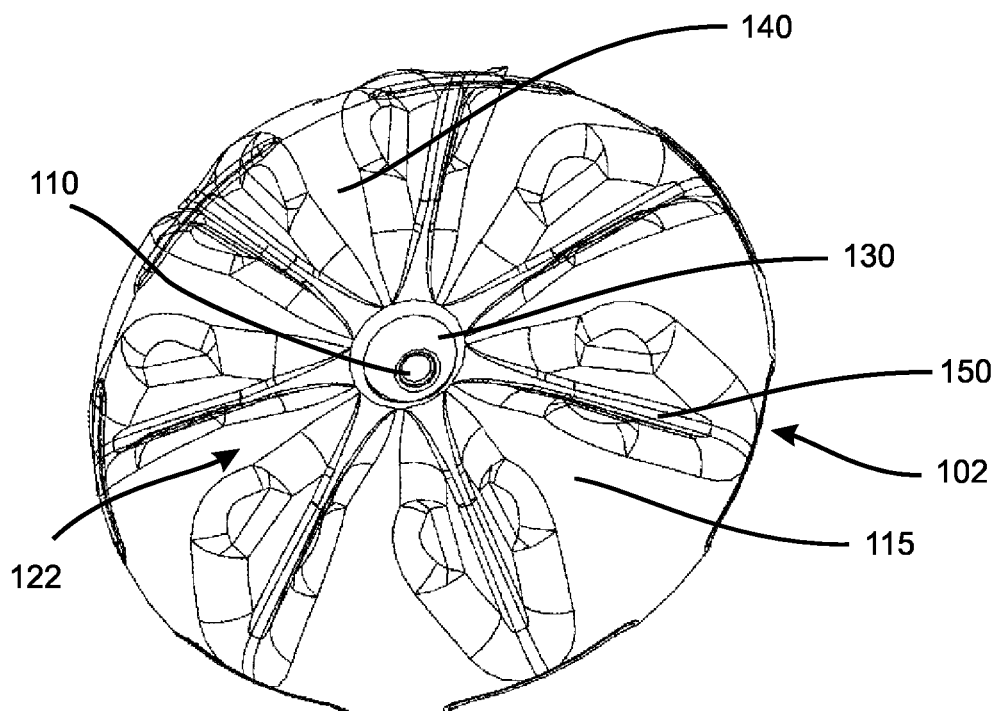
FIG. 2 a representation of a base section according to the invention.

FIG. 2 shows a perspective view of a base section according to the invention. This has an injection point 110, which is arranged in a first curved or dome-like structure 130. In addition, several standing foot areas 115 are provided and tension bands or reinforcing ribs are provided between each of these standing foot areas.

The reference sign 140 refers to a second curved or dome-like structure that is adjacent to the first curved structure 130. The reference sign 122 indicates a central area of the base section, which in particular includes the two curved structures 130 and 140. This central area 122 is in particular the area located inside the standing foot circle 132 (cf. FIG. 1a).

Preferably, the first curved structure 130 is formed circumferentially and/or without interruptions in the circumferential direction of the base section 102. Particularly preferably, the second curved structure 140 is not continuous and/or interrupted in the circumferential direction. More precisely, the second curved structure is interrupted in the circumferential direction by the tension bands 150 or the reinforcing ribs 150.

These tension bands can withstand increased radial loads in particular and especially tensile loads The modified stillwater base used in the state of the art does not meet all requirements:

It is true that the thermostability test for 24 h at 38° C. to have a positive ground clearance is fulfilled at an internal pressure above 0.5 bar. However, a final blowing pressure of less than 25.0 bar is not yet achieved with this design. Further criteria for such plastic containers are in particular the mouldability of the base geometry without white fracture and the passing of a drop test.

Extensive tests were carried out to find the base geometry according to the invention. This is a mixture of what is generally understood as a still water base and a petaloid base or NitroHotfill orange base design, wherein the advantages of both designs were combined in a particularly advantageous way and corresponding synergy effects were exploited.

The tests have shown that a tension band or a reinforcing rib, a raised injection point, a certain number of feet and a certain base weight advantageously achieve the desired results. In order to meet the requirements mentioned above, it is additionally advantageous to use a base post-cooling as part of the production process to improve the result.

The applicant carried out tests with a 1.85 l bottle, with a diameter of 100 mm and a base height of 23.0 mm and a standard-base height for still water bases with this diameter. Several preform weights, between 28.0 g and 38.0 g, with the same mouthpiece were used.

A partial result of these tests was that the base weight for this diameter or volume should not be less than 7.0 g on average to maintain an internal pressure of 2.0 bar (with passed thermal test and drop test). This also applies to the internal pressures from 0.5 bar to 3.0 bar.

Figure 3:
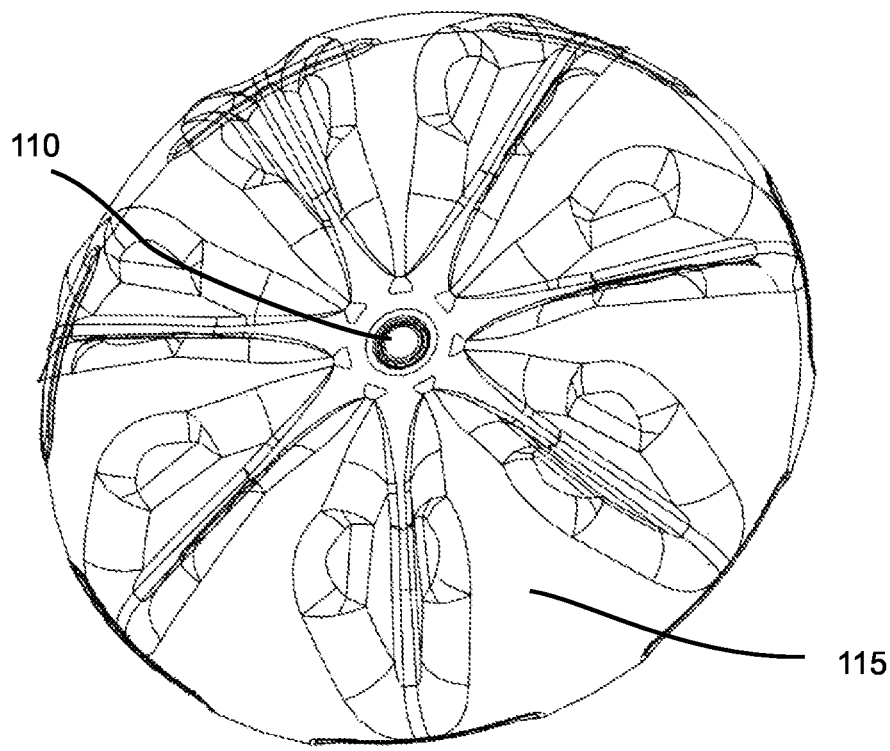
FIG. 3 a representation of an alternative base section.

FIG. 3 shows an alternative base design, wherein here the injection point is not located in the raised manner shown in FIG. 2. If the base centre is constructed without the raised injection point, similar to a petaloid base, only an internal pressure of 1.0 bar was achieved, with passed thermal test and drop test. The base weight here was on average 10.0 g.

The applicant has determined that a certain base weight is necessary for other diameters or volumes to achieve or maintain the internal pressure. In other words, the necessary base weight will also depend on quantities such as the volume or height of the container. Furthermore, there is a dependence on a diameter of the bases and a dependence on the preform weight both gross and net.

Figure 4:
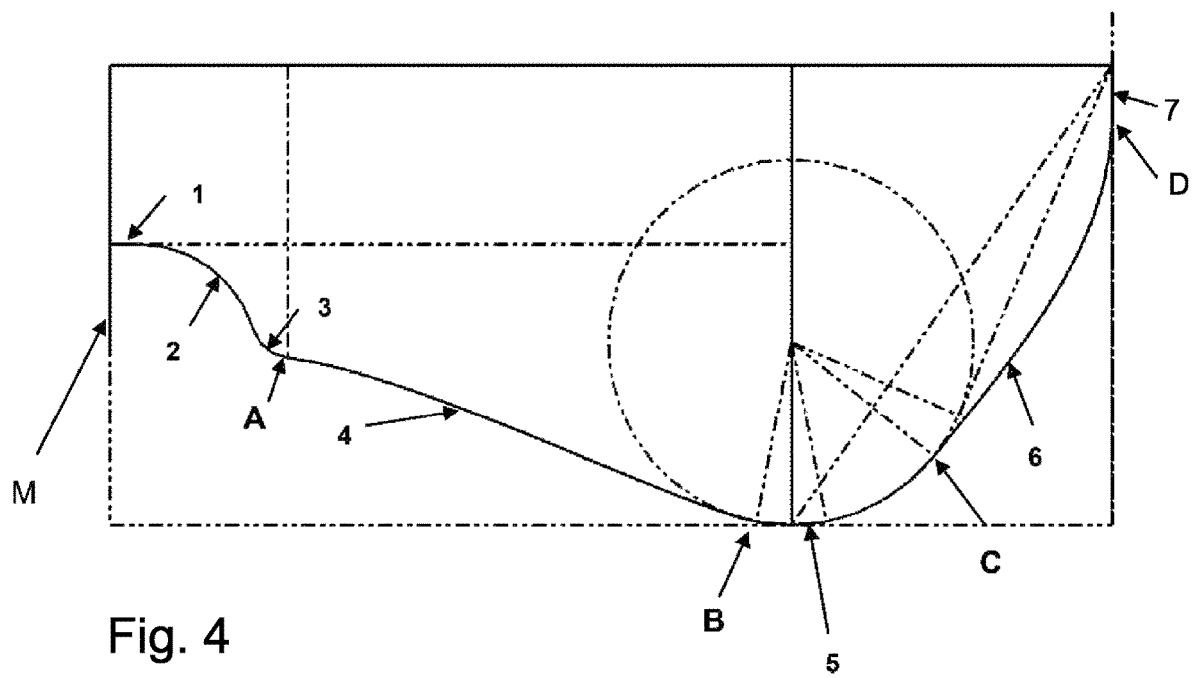
FIG. 4 a representation of a course of curvature.

FIG. 4 shows a progression of a basic contour of a base section 102 in the standing foot area.

The basic contour of a base section according to the invention is described in the embodiment shown in FIG. 4 by a (in particular straight) section 1, a curved section 2 adjoining this straight section 1 (this forms the first curved structure 130 mentioned above) and a (in particular in the opposite direction) curved section 3 adjoining this curved section (or radius) 2. Preferably, the radius of curvature in the section 2 is larger in amount than in the curved section 3. The injection point (not shown) is arranged in the area of the straight section 1.

The curved section 3 is followed by a (in particular curved) section 4 which can be described by a spline (which in particular forms the second curved structure 140) and by a foot radius section 5 (which preferably also forms the standing surface 132). This foot radius section is followed by a further section 6 that can be described by a spline and by a (preferably straight) section 7.

From this contour, the outer surface of the base geometry is generated by a rotation around the axis of rotation (axis M).

The transitions of the individual curved sections, the rectilinear section 1, the small dome radius (or curved section) 2, as well as the curved section 3 are preferably at least partially and are particularly preferably all tangentially continuous.

The transition from the curved section 3 to the bridging curve or section 4 at point A and/or the transition from section 4 to the foot radius section 5 at point B can preferably be continuous in curvature, but preferably at least continuous in tangent.

The transition from the foot radius section 5 into the section 6 at point C and/or the transition from the section 6 into the rectilinear section 7 at point D, are preferably continuous in curvature, particularly preferably in any case continuous in tangent.

The bridging curve or section 4 can be controlled in points A and B by the magnitude of the tangent vector. The tangent vector can be the in A and B, or in A greater than in B, or in A less than in B. The values of the tangent vector preferably range between 0 and 2.0, preferably between 0.2 and 1.0, particularly preferably between 0.3 and 0.8.

The course of curvature of sections 4 and 6 can preferably be described by a polynomial of the nth degree. The nth degree of the polynomial can preferably be between 2 and 7.

Figure 5:
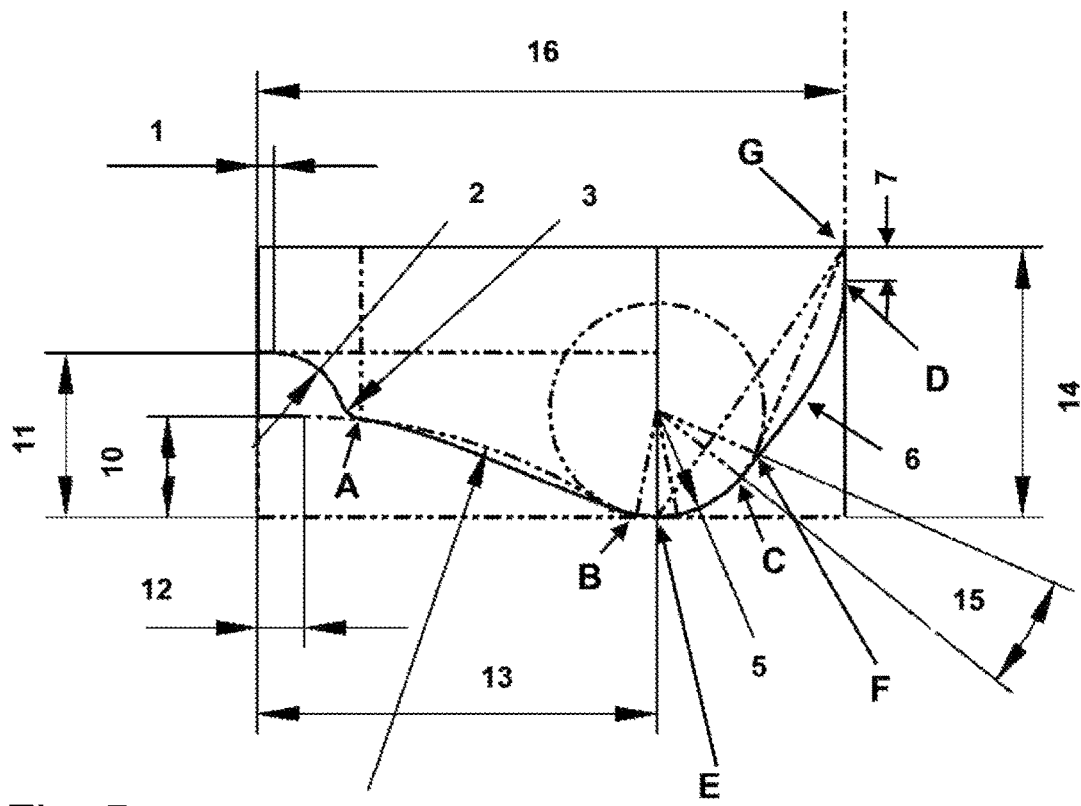
FIG. 5 a further illustration of a course of curvature.

FIG. 5 shows another illustration of a base section.

The outer dimensions of the base section are defined by the outer diameter 16 and the base height 14.

The dimension of the standing circle diameter 13 is preferably determined by a ratio to the outer diameter 16. The ratio is preferably between 0.615 and 0.835, preferably between 0.63 and 0.80, and particularly preferably between 0.65 and 0.75.

The height 11 of the small dome radius or the curved section 2 is preferably described by a ratio to the outer diameter 16 or by a ratio to the base height 14. The ratio to the base height is preferably between 0.25 and 0.80.

The height 10 of the section 4 is preferably described by a ratio to the outer diameter 16. Preferably, however, the height of the section 10 is always less than half of the base height 14.

The starting point C section 6 is preferably created by a straight line between G and F. The straight line FG is especially preferably tangential to the foot radius. The starting point C of section 5 can preferably be determined with the help of an angle 15 on the foot radius section 5 between the points E and F. This angle 15 is preferably greater than 5° and/or less than 30°.

Figure 6:
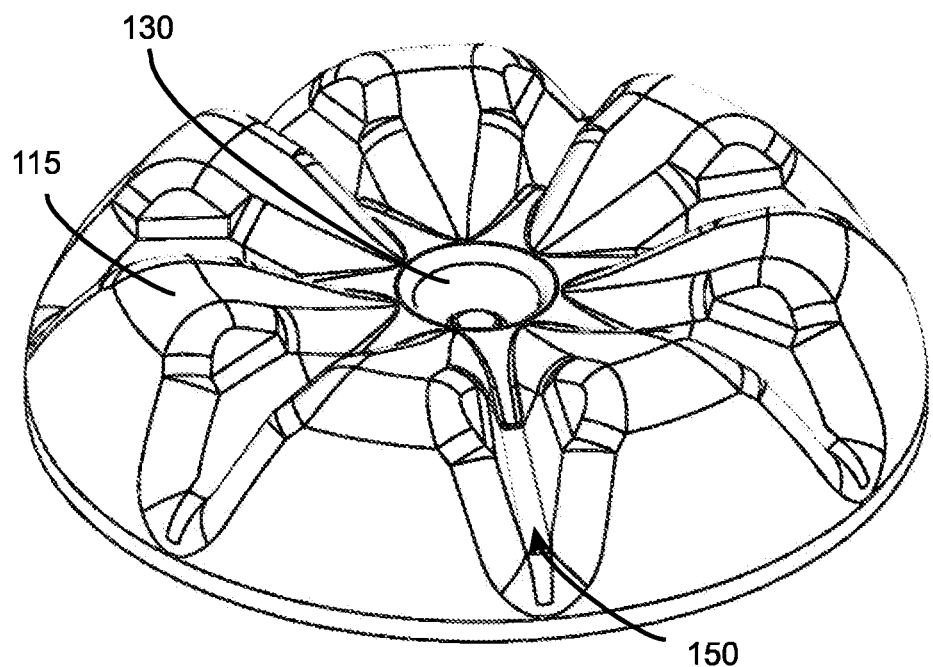
FIG. 6 a perspective view of the base section.

FIG. 6 shows an illustration of the base section 102, which is created with the course of curvature described above. This base section here has seven standing foot areas 115, which are each delimited from one another by the radially extending tension bands. It can also be seen again the first curved structure 130 and the injection point 110. It should be noted that the injection point is not a point in the geometric sense, but more precisely an injection area, which may for example have a circular profile. This injection point is created during the production of the plastic preforms in an injection moulding process.

Figure 7:
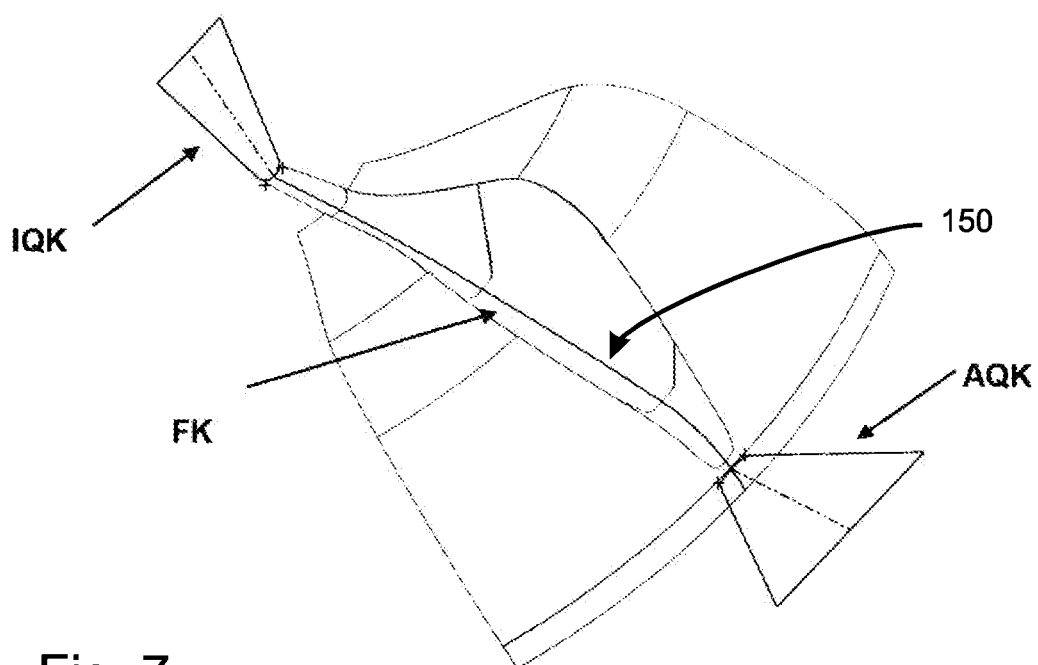
FIG. 7 a detailed view of the base section.

FIG. 7 shows a detailed representation of the base section in the area of a tension band 150. The geometry of the tension band 150 is preferably described by an inner cross-sectional contour IQK, a guide contour FK and an outer cross-sectional contour AQK. In a preferred embodiment, the tension band has two sections that are separated from each other.

Figure 8:
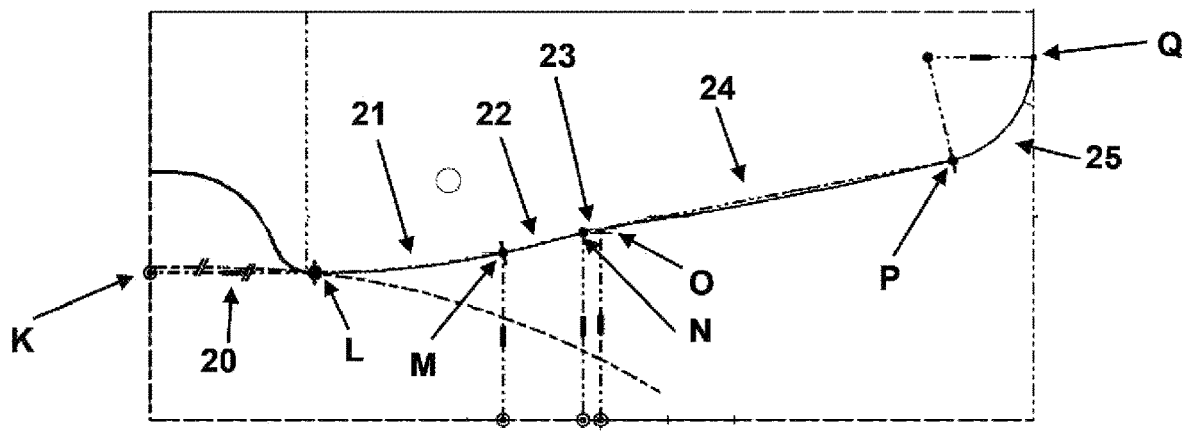
FIG. 8 a representation of the course of curvature of a tension band.
Figure 8A:
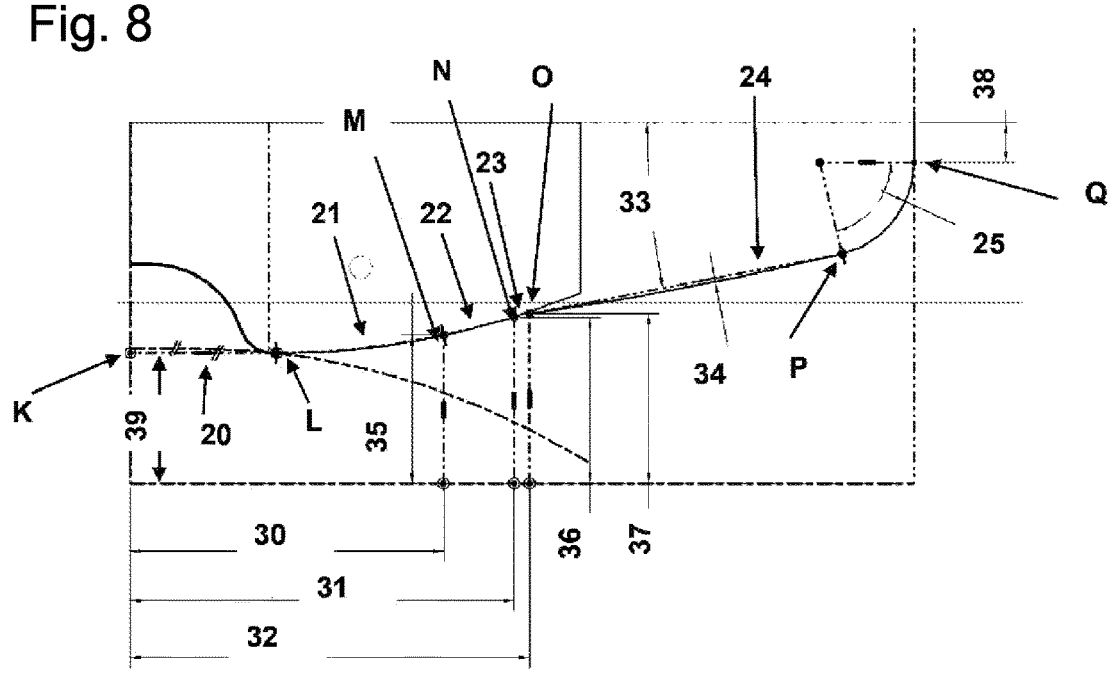
FIG. 8a a further illustration of the course of curvature of the tension band.

FIGS. 8 and 8a show the course of curvature in the area of a tension band.

The guiding contour of the tension band 150 is described by a straight course 20, followed by curved sections 21 and 22.

The curved section is followed by the curved section or the bridging curve 23, which can be described by a spline. This curved section 23 is followed by a straight line or chord 24 and this in turn is followed by the curved section 25.

The point L moves on the curved section 4 (FIG. 4) between points A and B. The height 39 (FIG. 8a) of the straight line 20 (FIG. 8) preferably has a predetermined distance to the height 10 (FIG. 4). This distance is preferably in relation to the base height 14 (FIG. 5).

The transitions of the radii or sections 21, 22, 23, 24, 25 and of the section 20 (FIG. 8) are preferably at least partially, and particularly preferably all, tangentially continuous. The transition from the section or radius 25 to the outer diameter 16 is preferably also tangentially continuous.

If the radius 23 is represented by a spline, the transitions can be described as follows:

The transition from the curved section or radius 22 to the bridging curve or section or spline 23 at point N, and/or the transition from section 23, to the straight or curved section or straight line or radius 24 at point O, can be continuous in curvature, but at least continuous in tangent.

The section or bridging curve or spline 23 can be controlled at points N and O by the magnitude of the tangent vector. The tangent vector can be the same in N and O, or greater in N than in O, or less in N than in O. The values of the tangent vector range from 0 to 2.0, preferably from 0.5 to 1.0.

The course of curvature of the splines 23 can be described by a polynomial of the nth degree. The nth degree of the polynomial is preferably between 2 and 7.

FIG. 8a shows another illustration of the course of curvature.

If the section 24 is designed as a straight line between the points O and P, this can be described via an angle 33. The angle can range between 5° and 18°, preferably between 7° and 15°.

The distance dimensions 30, 31, and 32 are preferably in a ratio to the outer diameter 16. The ratios vary and preferably range from 0.10 to 0.5.

Dimensions 35, 36, 37 and 38 are in proportion to base height 14.

The ratios are different, but can also be the same and range from 0.05 to 0.7. Furthermore, it is conceivable that the dimensions 35, 36, 37 and 38 are related to the dimension 39 instead of the base height.

Figure 9:
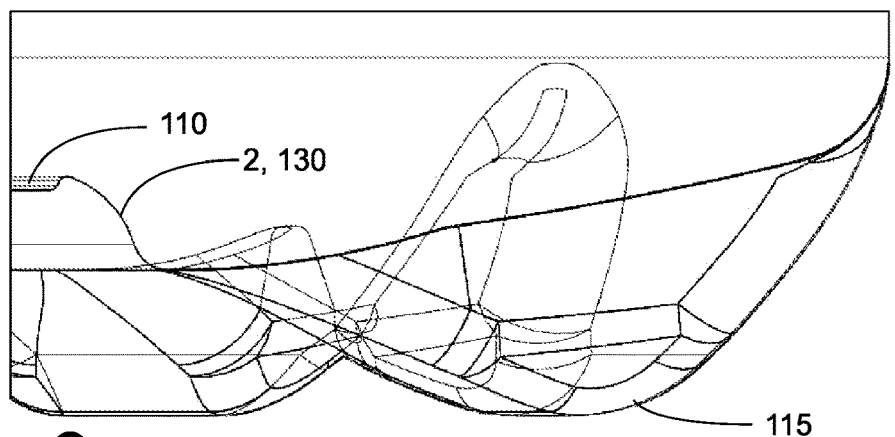
FIG. 9 a further partial representation of a base section.

FIG. 9 shows a further detailed perspective view of a base section. Here, a curve can be seen in the area of a standing foot 115 as well as in the area of a tension band 150.

Figure 10:
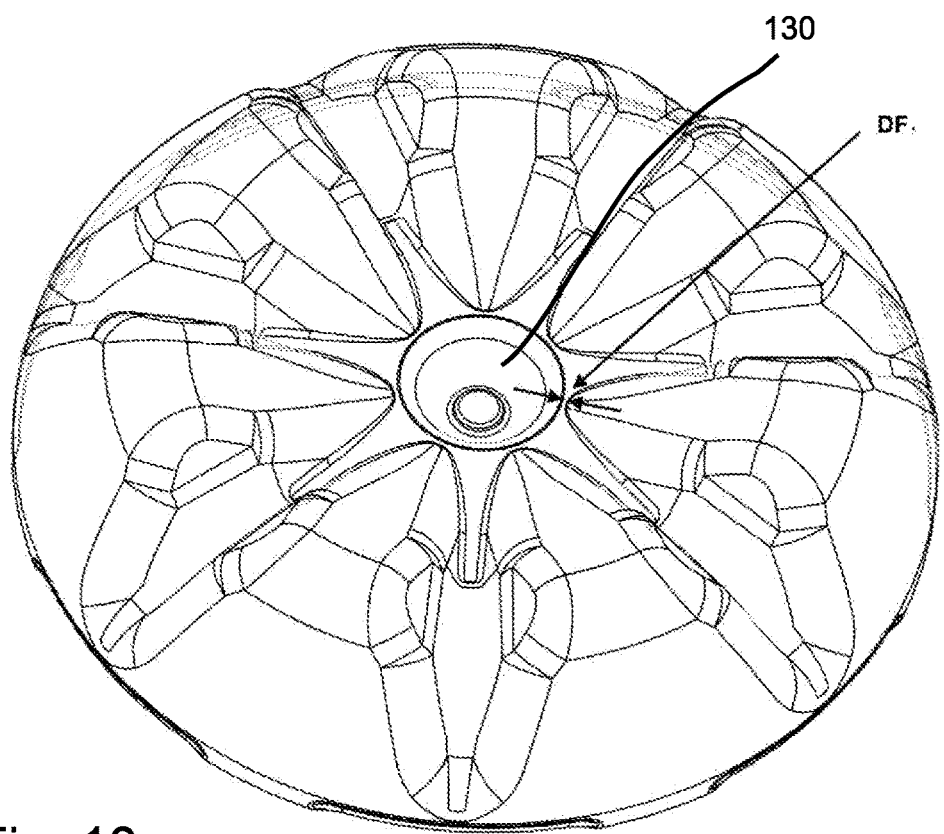
FIG. 10 a representation of the base section.

FIG. 10 shows a further illustration of the base section 102. In this illustration, it can be seen in particular that the foot areas 115 have a certain (radial) distance DF from the first curved structure 130.

This distance DF between the curved structure and the dome 130 on the one hand and the standing foot area or foot on the other hand can be adjusted via the dimension 39 (FIG. 8a). For this application, a short to hardly any distance would be selected, preferably below 0.5 mm. However, it is conceivable that a larger distance of up to 7 mm is selected.

Figure 11:
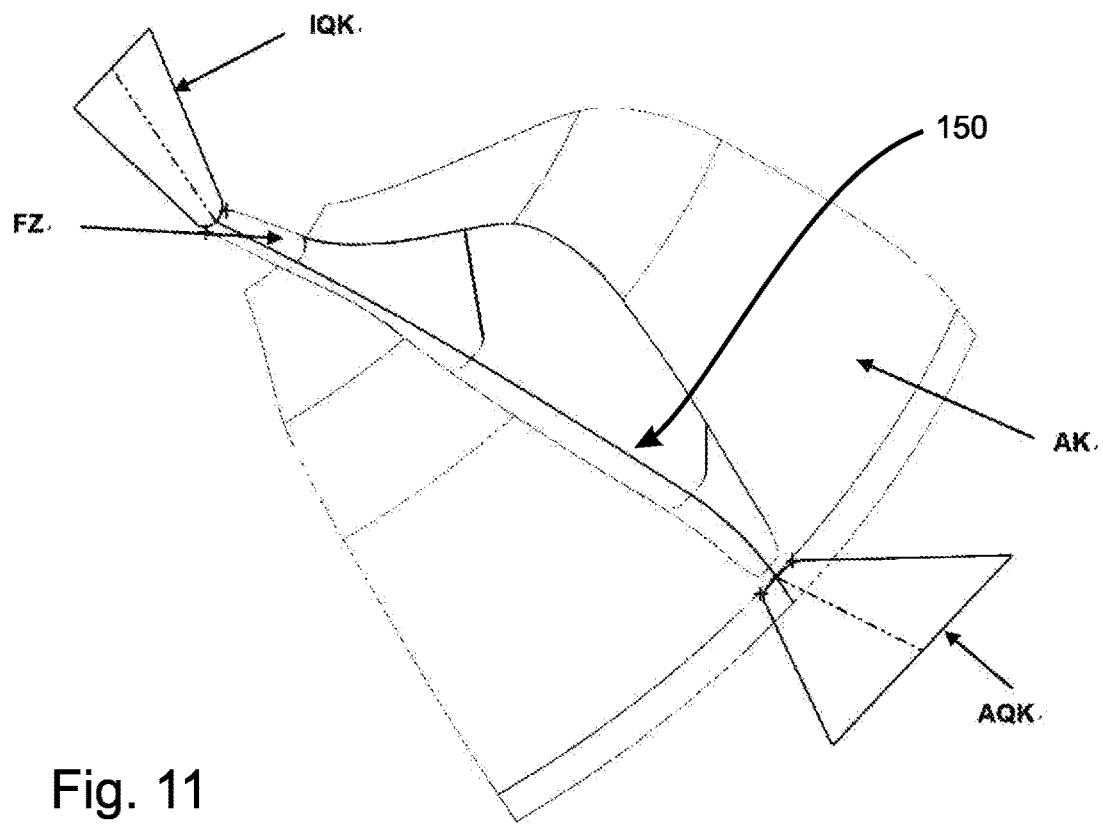
FIG. 11 a perspective view of a tension band.

FIG. 11 shows a further illustration of a base section in the area of a tension band. Several variations of cross-sectional contours are possible, e.g. trapezoid, circle, ellipse, triangle, rectangle, etc.

The number of feet created by the tension band or tension bands are preferably evenly distributed around the circumference of the base section 102. The number of feet around the circumference may range between 2 and 10, preferably between 5 and 8, particularly preferably between 6 and 7.

Preferably, there is an inner cross-sectional contour (IQK) which is close to the small dome or the first curved structure on the guide contour of the tension band and an outer cross-sectional contour (AQK) which intersects the outer diameter at point Q (cf. FIG. 8a).

With the help of the inner cross-sectional contour IQK, which is perpendicular to the guide contour at the point K, and the outer cross-sectional contour AQK, which is perpendicular to the guide contour at the point Q, a surface body tension band (FZ) is formed along the guide contour and preferably drawn off from the volume body of the outer contour (AK) (cf. FIG. 11).

The inner cross-sectional contour (IQK) and the outer cross-sectional contour of the tension band can be the same size, have the same parameters, or be different sizes and/or have different parameters. In a preferred embodiment, these contours merge continuously into one another in the radial direction of the tension band.

In a preferred embodiment, a cross-sectional contour of the guide band therefore changes in a radial direction of the base section. In a preferred embodiment, the tension band or the tension bands have a U-shaped contour or a V-shaped or triangular contour (or such a cross-section) in a radially inner region and a trapezoidal contour in an outer section.

Figure 12:
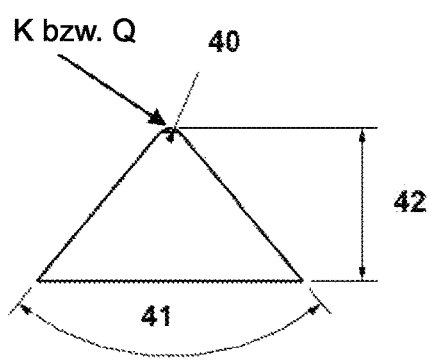
FIG. 12 a sectional view of a tension band or a reinforcing rib.
Figure 13:
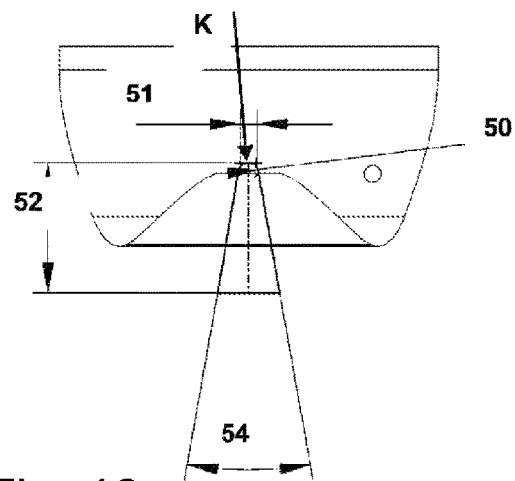
FIG. 13 a sectional view of a tension band or a reinforcing rib.

FIGS. 12 and 13 show possible contours of the tension bands and cross-sectional contours respectively.

Preferably, the radially inner contour can be designed as a triangular contour with isosceles sides.

Preferably, the triangular contour with the particularly preferred smooth and isosceles sides is defined by a radius 40, the height 42 and the opening angle 41. The opening angle is preferably between 5° and 150°, preferably between 10° and 120°.

In addition, the contour can also be designed as an isosceles and/or symmetrical trapezoidal contour.

The inner cross-sectional contour IQK of the trapezoid is preferably defined by the radius 50, the short trapezoid side 51, the height 52 and the opening angle 54. The opening angle 54 can be between 0° and 120°, preferably between 1 0° and 90°.

Figure 14:
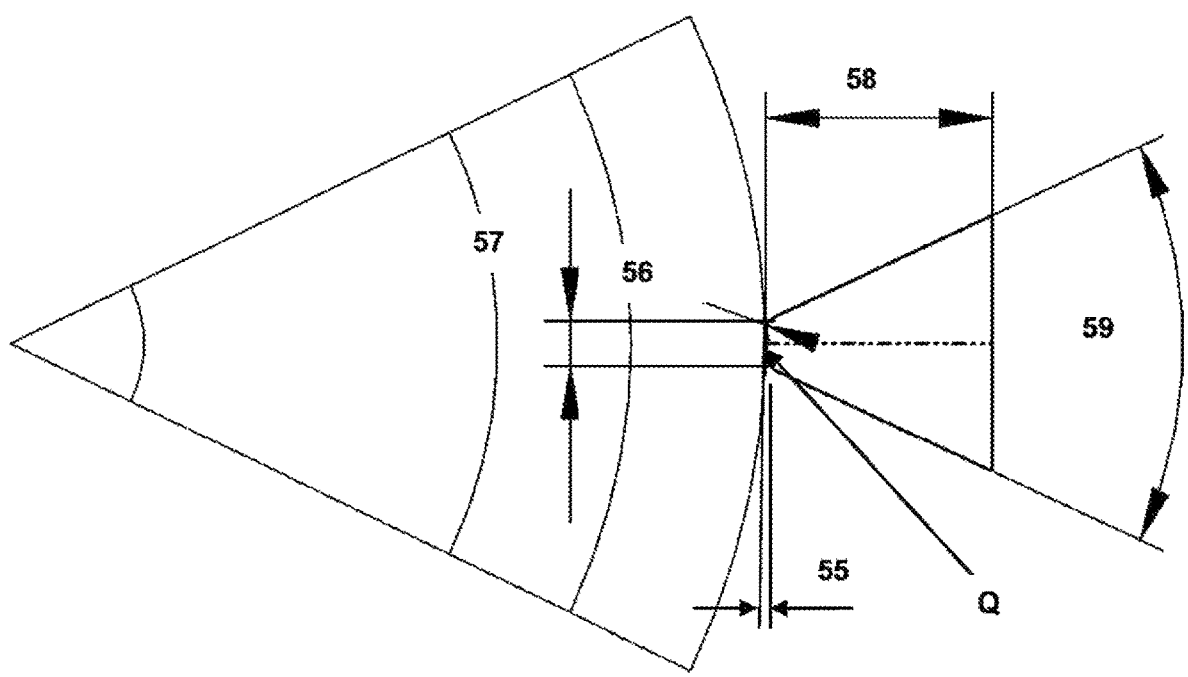
FIG. 14 an illustration of a tension band or a reinforcing rib.

FIG. 14 shows a representation of the outer cross-sectional contour. The outer cross-sectional contour AQK of the trapezoid is preferably defined by the radius 56, the short trapezoid side 57, the height 58 and the opening angle 59. The opening angle 59 preferably has values between 5° and 150°, preferably between 15° and 90°.

The outer cross-sectional contour AQK can have a distance 55 of 0 to 3.0 mm at point Q, preferably perpendicular to the guide contour, in order to determine the height of the run-out of the tension band geometry at the circumference.

Figure 15:
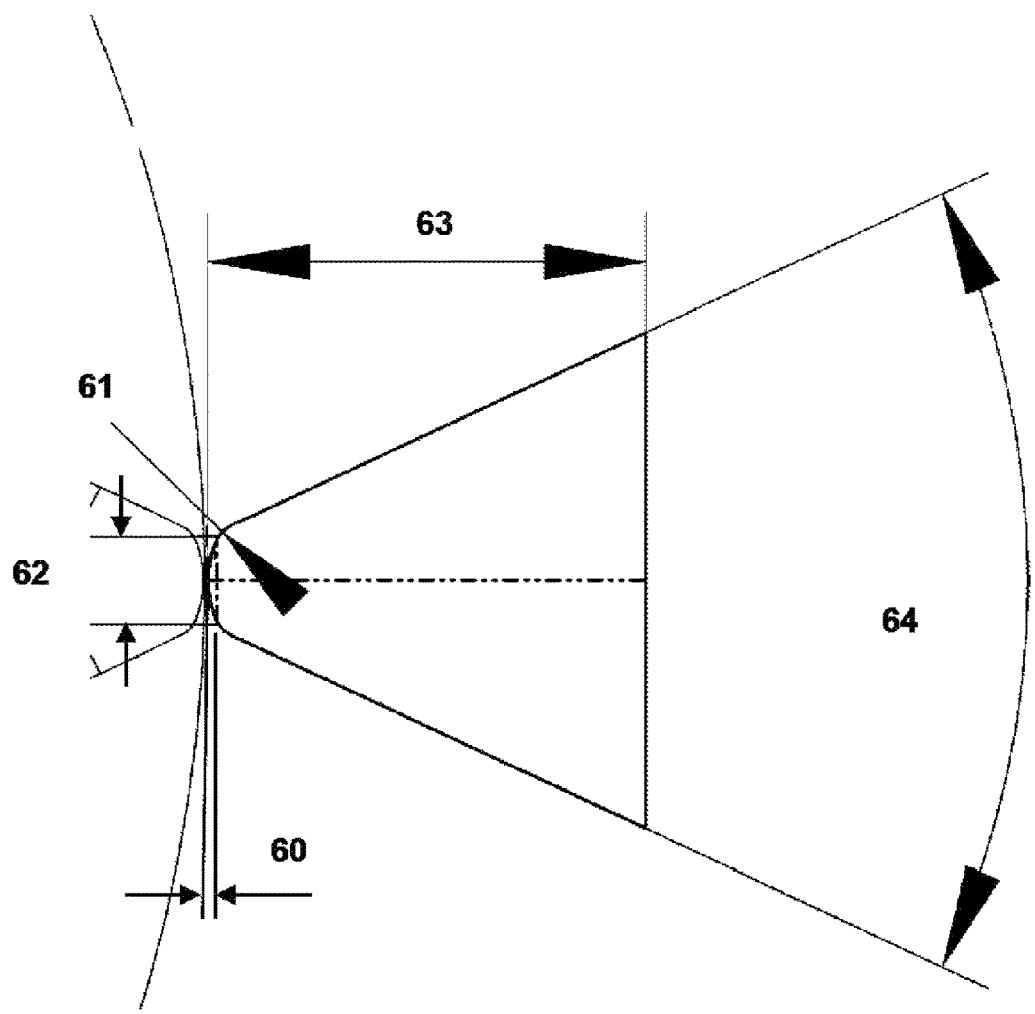
FIG. 15 a representation of a tension band or a reinforcing rib.

FIG. 15 shows an illustration of a modified cross-sectional contour.

The inner and outer cross-sectional contour of the trapezoid could also have a circular arc (radius) instead of the short trapezoid side, which is in particular designed as a chord. With a dimension 60, which defines the curvature of the chord, the short trapezoidal side 62, the height 63 and the opening angle 64 are defined via the radius 61.

The opening angle preferably has values between 5° and 150°, particularly preferably between 15° and 90°.

The outer cross-sectional contour AQK can have a distance of 0 to 3.0 mm at point Q, in particular perpendicular to the guide contour, in order to determine the height of the run-out of the tension band geometry at the circumference.

Figure 16:
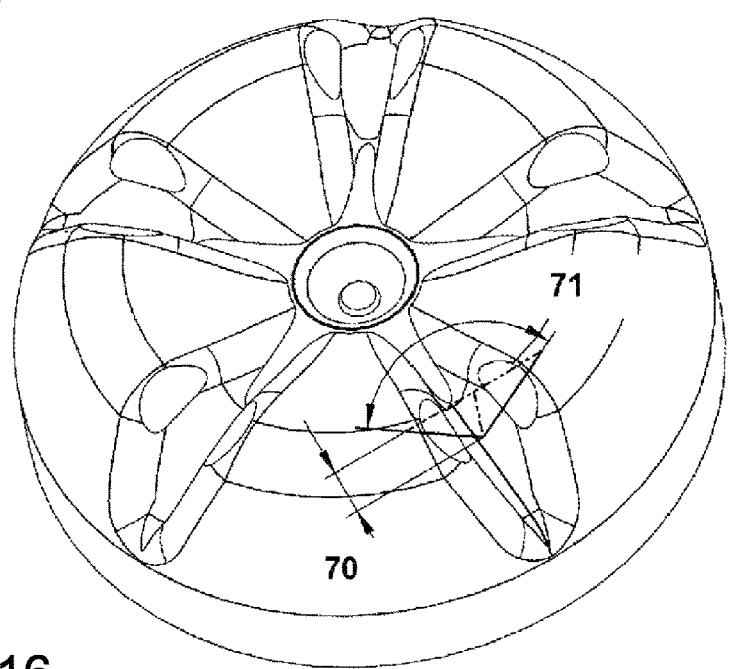
FIG. 16 a perspective view of the base section.
Figure 17:
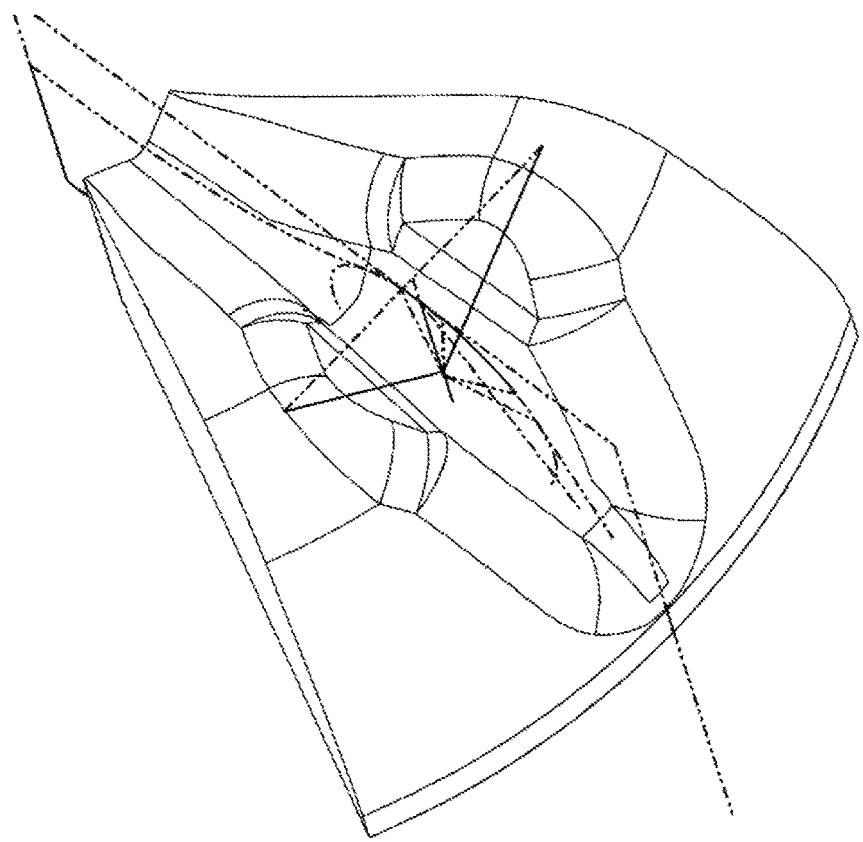
FIG. 17 a detailed view of the base section from FIG. 16.

FIGS. 16 and 17 show two further illustrations of the base section in the area of a tension band. In these illustrations it can be seen that the tension band shown, and in particular its second section, widens radially outwards. In addition, it can be seen that the first section of the tension band, i.e. the radially inner section, widens inwards in the radial direction.

As stated above, the tension band can widen or broaden outwards in the radial direction of the base section. Preferably, a cross-sectional area of the tension band increases in the radial direction from the inside to the outside, at least in sections.

This spreading of the tension band, for example at the height of the standing circle diameter, can be carried out in order to improve the blowability or formability and thus to further reduce the blowing pressure.

The cut-out contour in the form of a triangle preferably moves on the line from the lower edge of the base section to the upper edge of the arch section. The beginning of the cut-out contour or the depth of immersion in the base section is preferably controlled by a percentage value of the base height.

The size of the cut-out contour is preferably controlled by the height of the triangle 70 and the opening angle 71. The opening angle 71 can assume values from 45° to 150°, preferably between 60° and 120°.

In a further preferred embodiment, the tension band is formed in two parts in the radial direction, wherein the contours in these at least two sections of the tension band differing in a particularly preferred manner.

Figure 18A:
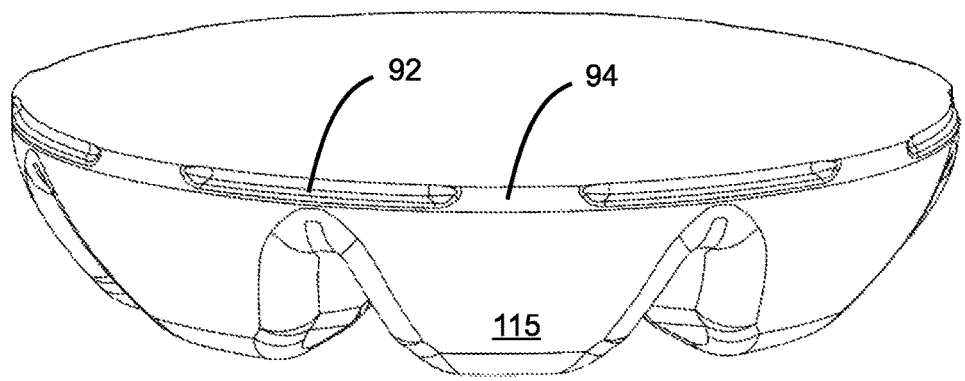
FIG. 18a, b two side views of a base section.
Figure 18B:
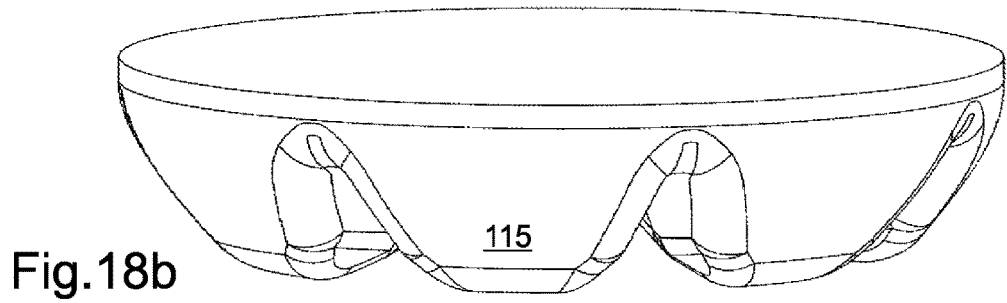

FIGS. 18a and 18b show two side views of a base section.

To stabilise the surface of the base section under internal pressure and to avoid bulges (so-called "halos") above the tension bands, an interrupted groove 92 can be helpful. This interrupted groove is located—preferably centrally—above each tension band (FIG. 18a). The number preferably corresponds to the number of feet or standing foot areas. However, this interrupted groove can also be omitted (FIG. 18b).

Figure 19:
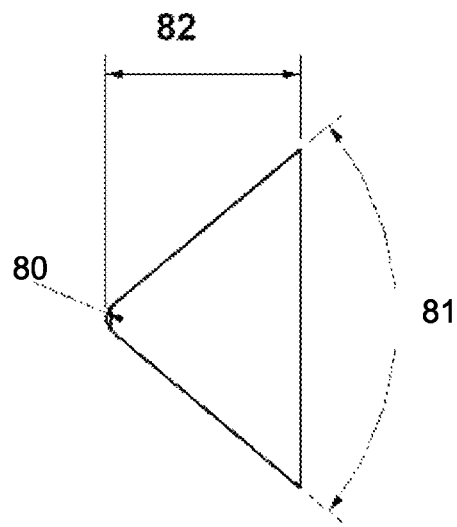
FIG. 19 a sectional view of the base section.

FIG. 19 shows a sectional view of the interrupted rib. The geometry of the interrupted groove can have any geometry, e.g. a preferred geometry of a triangle or a curved geometry. The triangle in FIG. 19 is rotated by 90° and used instead of a curved geometry.

The triangular contour with the smooth and isosceles sides is preferably defined by the radius 80, the height 82 and an opening angle 81. The opening angle is preferably between 5° and 150° and particularly preferably between 10° and 120°.

As explained, the grooves 92 are in particular interrupted. Preferably, these grooves 92 have a greater length in the circumferential direction of the base section than the interruptions 94 lying between these grooves 92. Particularly preferably, the grooves 92 extend perpendicular to the longitudinal direction of the plastic container.

Figure 20:
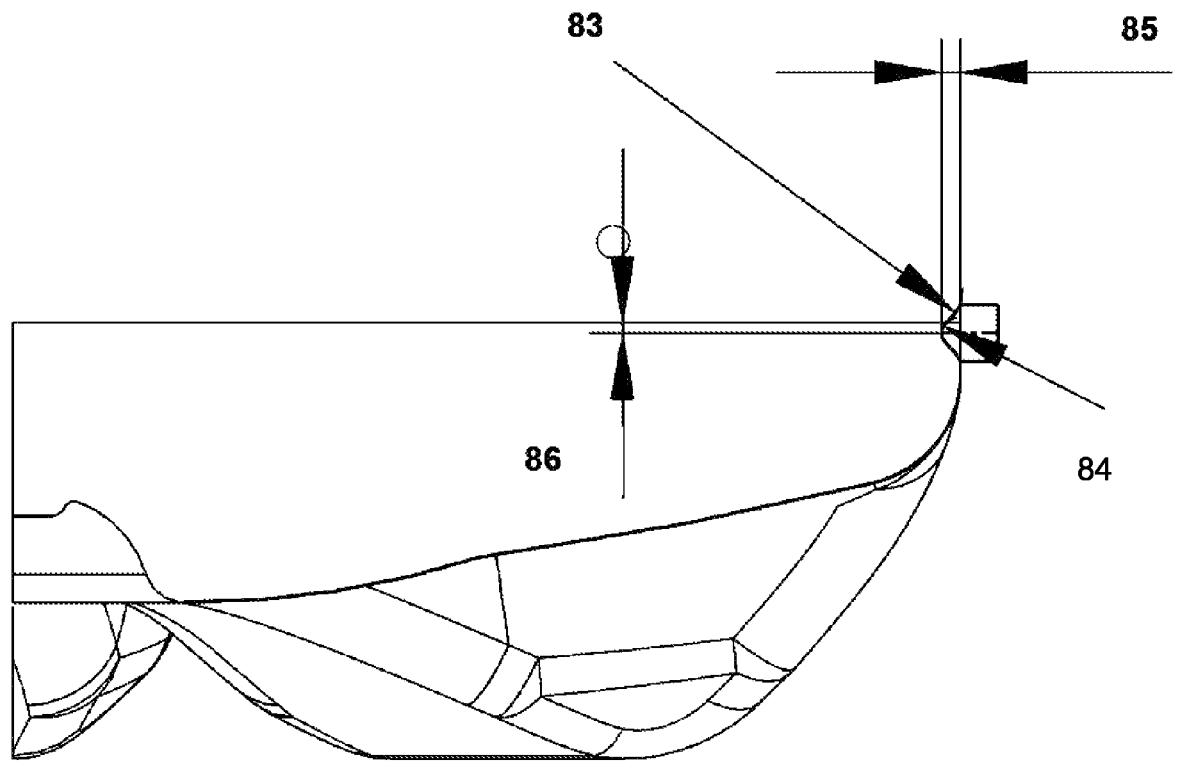
FIG. 20 a detailed side view of the base section.

FIG. 20 shows a sectional view illustrating the groove 92. An immersion depth of the groove geometry is preferably controlled by dimension 85 (FIG. 20) and the height of the top edge of the base by dimension 86 (FIG. 20). The opening angle of the interrupted groove depends on the number of feet of the base on the circumference and is preferably between 60° and 90°.

FIGS. 21a-21d show four illustrations of base sections 102 in different embodiments. In each of the embodiments, the central region is provided with the injection point 110, wherein in each case the first curved structure 130 described above is provided and also the second curved structure.

The base sections shown in FIGS. 21a-21d differ in the number of standing foot areas or standing feet.

Figure 21A:
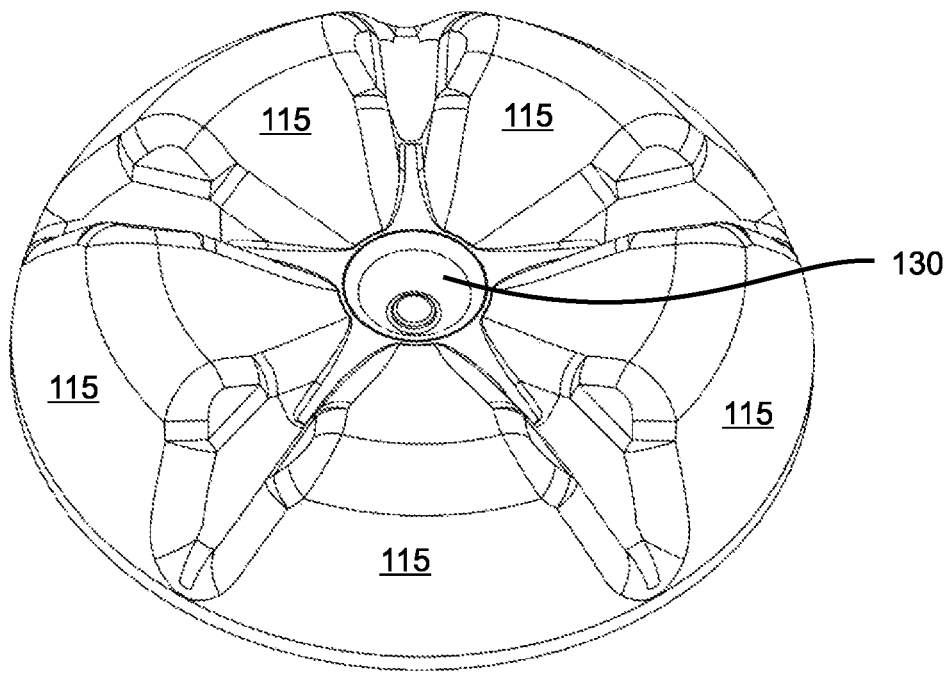
FIG. 21a-d four views of base sections.
Figure 21B:
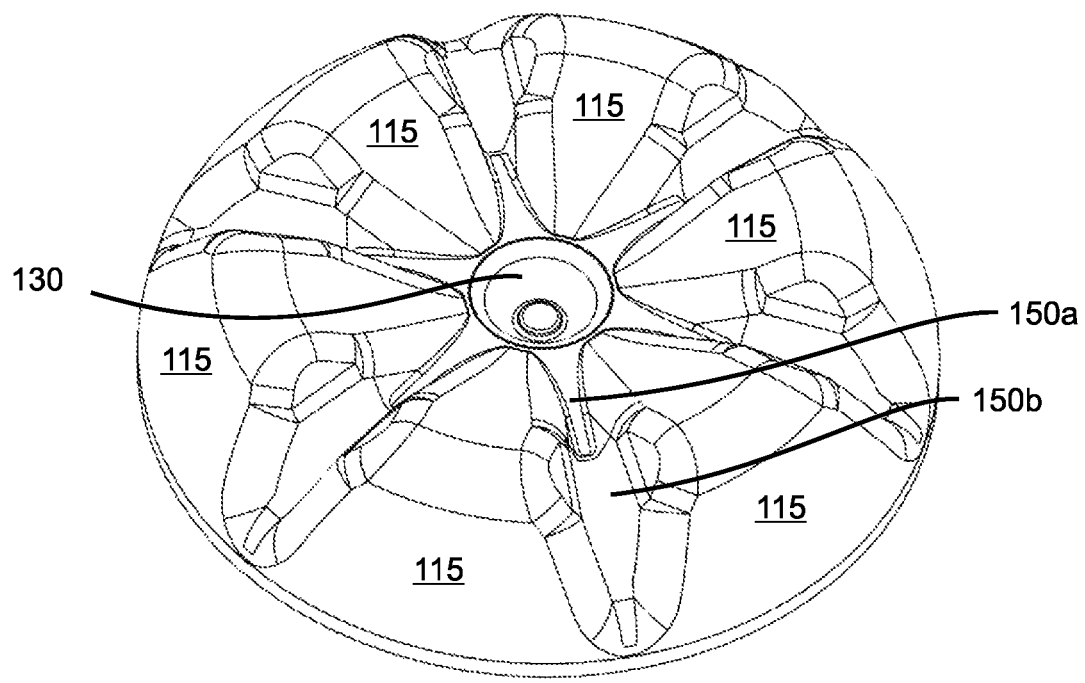
Figure 21C:
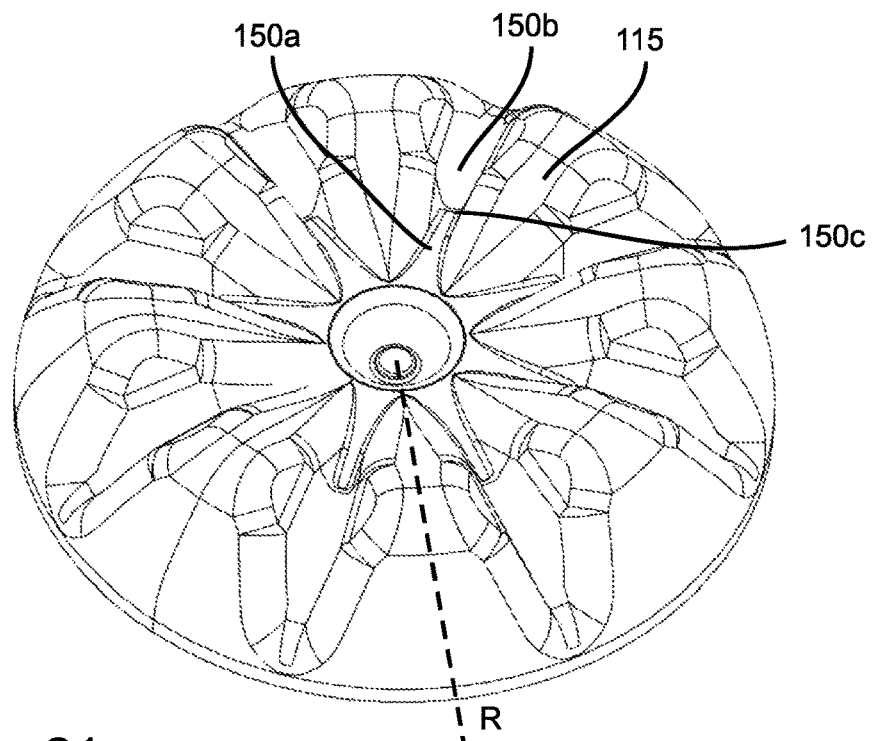
Figure 21D:
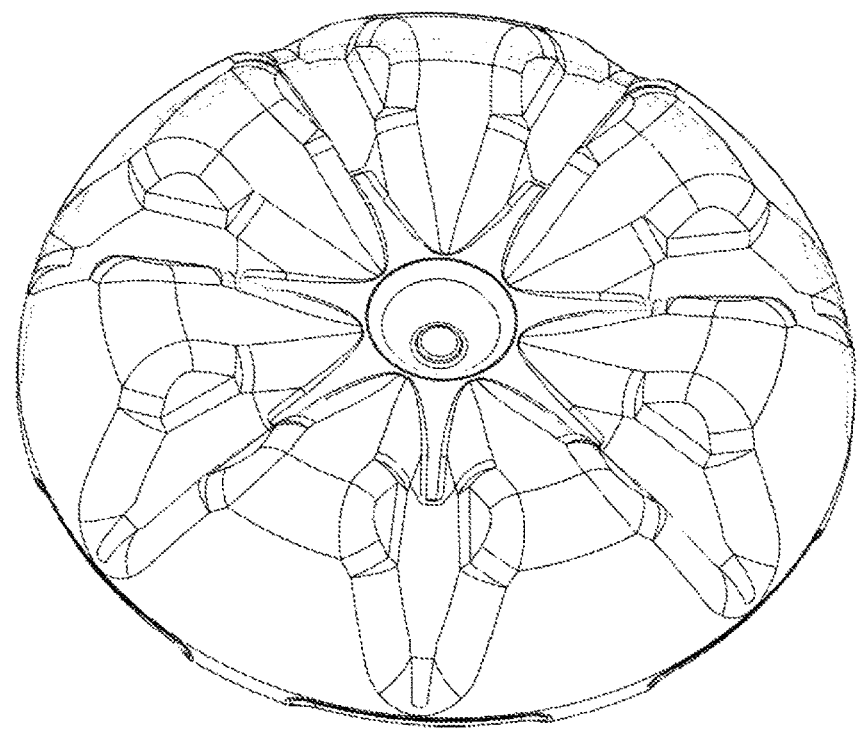

In the embodiment shown in FIG. 21a, five standing foot areas are provided, in the embodiment shown in FIG. 21b, six standing foot areas are provided, in the embodiment shown in FIG. 21c, eight standing foot areas are provided, and in the embodiment shown in FIG. 21d, seven standing foot areas are provided.

Furthermore, in the embodiment shown in FIG. 21d, the grooves 92 described above are provided in the circumferential direction of the base section. However, it should be noted that these grooves can also be provided in the embodiments shown in FIGS. 21a-21c.

In all the embodiments shown in FIGS. 21a-21d, the tension bands are each formed in two parts and have a first section 150a extending in the radial direction R and a second section extending in the radial direction R.

Preferably, the first section 150a tapers outwards in the radial direction, particularly preferably continuously. Preferably, the second section 150b of the tension band widens outwards in the radial direction R.

Preferably, the first section 150a and the second section 150b are separated from each other by a web 150c extending in the circumferential direction. This web 150c preferably has a length in the radial direction that is greater than 0.1 mm, preferably greater than 0.2 mm and preferably greater than 0.5 mm. In a further preferred embodiment, this web 150c has a length in the radial direction that is less than 3 mm, preferably less than 2 mm, preferably less than 1 mm.

Figure 22A:
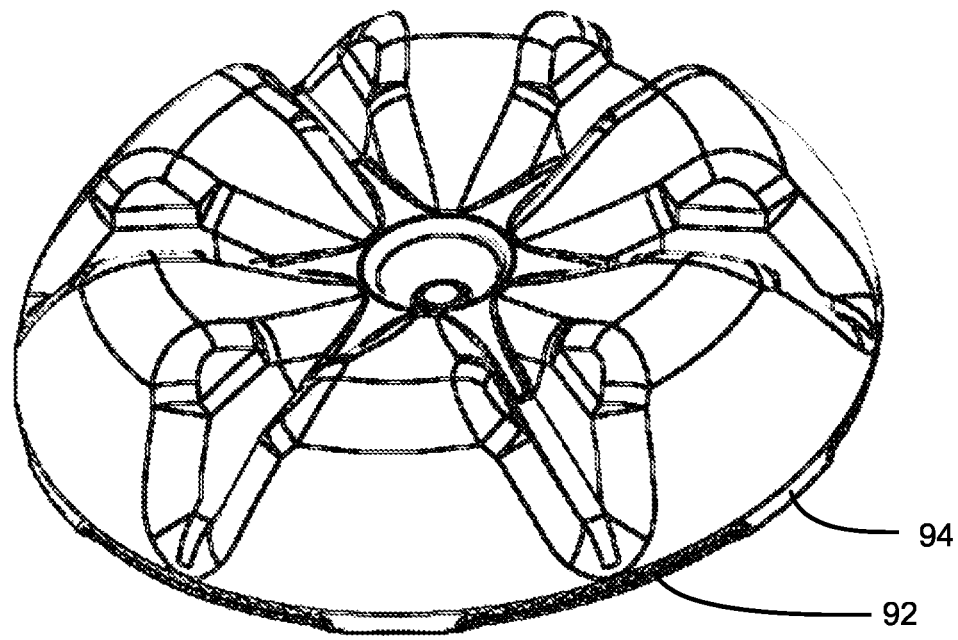
FIG. 22a, b two further views of base sections.
Figure 22B:
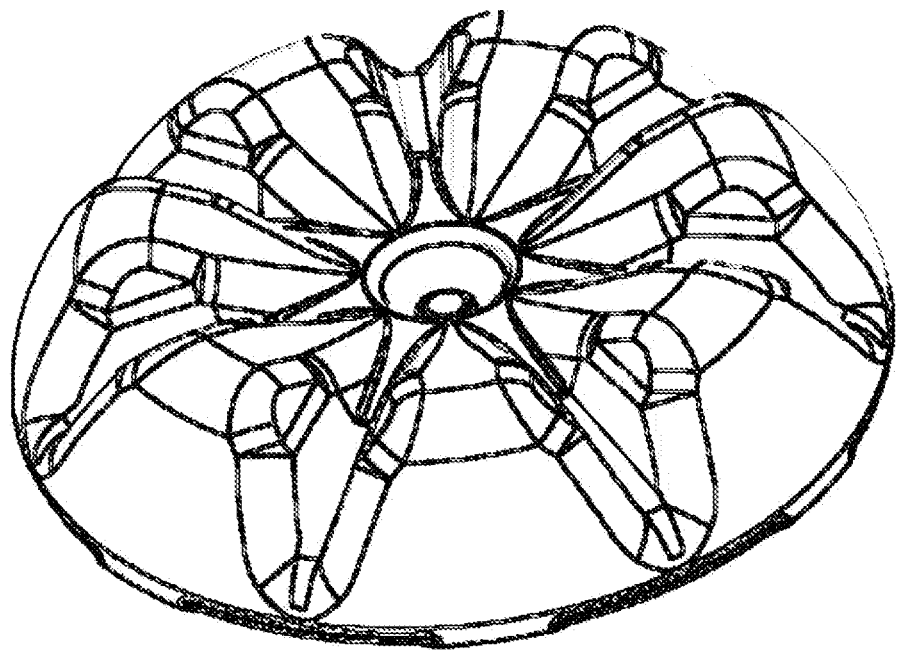

FIGS. 22a and 22b show two further illustrations of base sections. These also each have the grooves 92 and the sections 94 lying between these grooves. In these designs, too, the tension bands are each made in two parts.

The base section shown in FIG. 22a has six standing foot areas and the base section shown in FIG. 22b has seven standing foot areas.

The applicant reserves the right to claim all features disclosed in the application documents as essential to the invention if they are individually or in combination new compared to the prior art. It is further pointed out that the individual figures also describe features which may be advantageous in themselves. The skilled person immediately recognises that a certain feature described in a figure can also be advantageous without adopting further features from this figure. Furthermore, the skilled person recognises that advantages can also result from a combination of several features shown in individual figures or in different figures.

The invention claimed is:

1. A plastic container for holding liquids and in particular beverages, having a base section which forms an at least partially circumferential standing surface, having a main body which adjoins the base section in a longitudinal direction of the container, which forms an inner volume of the plastic container, within which the liquid can be held, and having a mouth section with a mouth via which a liquid can be filled into the plastic container, wherein
the base section has a plurality of standing foot areas, wherein a tension band extending in a radial direction being arranged between two adjacent standing foot areas and the base section having a first curved structure with an injection point in such a manner that the injection point projects in the longitudinal direction of the plastic container towards the mouth of the plastic container, and a second curved structure adjoins the first curved structure in the radially outward direction, wherein this second curved structure is curved in the direction of the mouth of the plastic container, wherein a radius of curvature of the first curved structure is smaller, at least in sections, than a radius of curvature of the second curved structure and wherein at least one tension band has a first section and a second section, which each extend in the radial direction and which are spaced apart from one another.

2. The plastic container according to claim 1, wherein a proportion by weight of the base section in the total weight of the plastic container is greater than 10%, and/or a proportion by weight of the base section in a total weight of the plastic container is less than 50%.

3. The plastic container according to claim 1, wherein a total weight of the base section is greater than 3 g.

4. The plastic container according to claim 1, wherein a height of the first curved structure has a ratio to the height of the base section which is between 0.25 and 0.80 and/or the height of the second domed structure has a ratio to the height of the base section which is below 0.5.

5. The plastic container according to claim 1, wherein, the base section merges into the main body via a portion describable by a spline.

6. The plastic container according to claim 1, wherein the second curved structure runs at an angle relative to the longitudinal direction which is greater than 20° and/or that the frustoconical section runs at an angle relative to the longitudinal direction which is less than 80°.

7. The plastic container according to claim 1, wherein all standing foot regions are of the same design.

8. The plastic container according to claim 1, wherein at least one standing foot area and preferably several standing foot areas and preferably all standing foot areas are spaced apart from the central portion and/or the first curved structure in the radial direction.

9. The plastic container according to claim 1, wherein a ratio between a standing circle diameter and an outer diameter of the container is between 0.615 and 0.835.

10. The plastic container according to claim 1, wherein the at least one tension band runs at least in sections.

11. The plastic container according to claim 1, wherein the tension band has a cross-section selected from a group of cross-sections including trapezoidal cross-sections, circular segment-shaped cross-sections, elliptical cross-sections, triangular cross-sections, rectangular cross-sections and the like.

12. The plastic container according to claim 1, wherein the base section has at least one groove running around in the circumferential direction of the base section.

13. A method of manufacturing a plastic container having a base section which forms an at least partially circumferential standing surface, having a main body which adjoins the base section in a longitudinal direction of the container, which forms an inner volume of the plastic container, within which the liquid can be held, and having a mouth section with a mouth via which a liquid can be filled into the plastic container, wherein
the base section has a plurality of standing foot areas, wherein a tension band extending in a radial direction being arranged between two adjacent standing foot areas and the base section having a first curved structure with an injection point in such a manner that the injection point projects in the longitudinal direction of the plastic container towards the mouth of the plastic container, and a second curved structure adjoins the first curved structure in the radially outward direction, wherein this second curved structure is curved in the direction of the mouth of the plastic container, wherein a radius of curvature of the first curved structure is smaller, at least in sections, than a radius of curvature of the second curved structure and wherein at least one tension band has a first section and a second section, which preferably each extend in the radial direction and which are spaced apart from one another, wherein plastic preforms are first provided and said plastic preforms are heated and said plastic pre-forms are expanded within a blow mould, wherein a base section of said blow mould is configured to produce a base section of a plastic container, wherein the plastic preforms are pressurized for their expansion with a gaseous medium having at least two different pressure levels, wherein one of said pressure levels having a final blowing pressure and said final blowing pressure being below 30 bar.

14. The plastic container according to claim 1, filled with pressurised products.

15. A method of manufacturing a plastic container according to claim 13, wherein said blow mould comprises a base part configured for producing the base section for a plastic container.

16. The plastic container according to claim 12, wherein the base section has a plurality of grooves running around in the circumferential direction of the base section.

17. The plastic container according to claim 5, wherein the spline has a course of curvature of a polynomial of the nth degree, where the degree lies between 2 and 7.

18. The plastic container according to claim 10, wherein the at least one tension band runs in a straight line.

\* \* \* \* \*